United States Patent
Wang

(10) Patent No.: US 6,455,083 B1
(45) Date of Patent: Sep. 24, 2002

(54) EDIBLE THERMOPLASTIC AND NUTRITIOUS PET CHEW

(75) Inventor: Shu Huan Wang, Plano, TX (US)

(73) Assignee: Natural Polymer International Corporation, Richardson, TX (US)

( * ) Notice: Subject to any disclaimer, the term of this patent is extended or adjusted under 35 U.S.C. 154(b) by 0 days.

(21) Appl. No.: 09/467,412

(22) Filed: Dec. 20, 1999

Related U.S. Application Data

(63) Continuation-in-part of application No. 09/145,659, filed on Sep. 2, 1998, now Pat. No. 6,379,725, which is a continuation-in-part of application No. 09/072,857, filed on May 5, 1998, now Pat. No. 5,922,379.

(51) Int. Cl.[7] .............................. A23J 3/04; A23J 3/14; A23K 1/18
(52) U.S. Cl. ..................... 426/104; 426/656; 426/657; 426/661; 426/805
(58) Field of Search ................................ 426/138, 549, 426/551, 553, 561, 564, 656, 657, 661, 805, 104

(56) References Cited

U.S. PATENT DOCUMENTS

| | | | |
|---|---|---|---|
| 3,871,334 A | 3/1975 | Axelrod ..................... 119/29.5 |
| 3,950,545 A | 4/1976 | Hayward et al. .............. 426/72 |
| 4,045,585 A | 8/1977 | Appleman et al. .......... 426/331 |
| 4,076,846 A | 2/1978 | Nakatsuka et al. ............ 426/62 |
| 4,163,804 A | * 8/1979 | Meyer et al. ................ 426/315 |
| 4,310,558 A | 1/1982 | Nahm, Jr. .................... 426/98 |
| 4,465,702 A | 8/1984 | Eastman et al. ............. 426/578 |
| 4,513,014 A | 4/1985 | Edwards ..................... 426/132 |
| 4,557,219 A | 12/1985 | Edwards ..................... 119/29.5 |
| 4,592,795 A | 6/1986 | Bridgeford .................. 156/203 |
| 4,674,444 A | 6/1987 | Axelrod ..................... 119/29.5 |
| 4,771,733 A | 9/1988 | Axelrod ..................... 119/29.5 |
| 4,863,655 A | 9/1989 | Lacourse et al. ............. 264/53 |
| 4,892,748 A | 1/1990 | Andersen et al. ........... 426/635 |
| 4,928,632 A | 5/1990 | Gordon ..................... 119/29.5 |
| 5,011,679 A | 4/1991 | Spanier et al. ................ 424/57 |
| 5,057,157 A | 10/1991 | Jane et al. ..................... 127/70 |
| 5,084,297 A | * 1/1992 | Merrick ...................... 426/641 |
| 5,160,368 A | 11/1992 | Begovich ................. 106/154.1 |
| 5,200,212 A | 4/1993 | Axelrod .......................... 426/2 |
| 5,240,720 A | 8/1993 | Axelrod .......................... 426/2 |
| 5,274,053 A | * 12/1993 | Kurata et al. ................ 525/479 |
| 5,320,669 A | 6/1994 | Lim et al. .................. 106/154.1 |
| 5,321,064 A | 6/1994 | Vaidya et al. ................. 524/56 |
| 5,339,771 A | 8/1994 | Axelrod ...................... 119/710 |
| 5,354,621 A | 10/1994 | Libermann .................. 428/532 |
| 5,397,834 A | 3/1995 | Jane et al. .................. 525/54.1 |
| 5,419,283 A | 5/1995 | Leo ............................ 119/709 |
| 5,446,078 A | 8/1995 | Vaidya et al. ................. 524/17 |
| 5,476,069 A | 12/1995 | Axelrod ...................... 119/709 |
| 5,501,868 A | 3/1996 | Collings et al. ............. 426/623 |
| 5,523,293 A | 6/1996 | Jane et al. .................... 514/21 |
| 5,545,450 A | 8/1996 | Andersen et al. .......... 428/34.5 |
| 5,549,859 A | 8/1996 | Andersen et al. ............ 264/102 |
| 5,580,624 A | 12/1996 | Andersen et al. .......... 428/34.5 |
| 5,618,341 A | 4/1997 | Andersen et al. ............ 106/287 |
| 5,660,900 A | 8/1997 | Andersen et al. .......... 428/35.6 |
| 5,665,152 A | 9/1997 | Bassi et al. ............... 106/145.1 |
| 5,736,586 A | 4/1998 | Bastioli et al. ............. 521/84.1 |
| 5,770,248 A | 6/1998 | Leibfred et al. ............... 426/93 |
| 5,773,070 A | 6/1998 | Kazemzadeh ................ 426/573 |
| 5,806,466 A | 9/1998 | Pintor et al. ................. 119/770 |
| 5,832,877 A | 11/1998 | Markham .................... 119/710 |
| 5,865,146 A | 2/1999 | Markham .................... 119/707 |
| 5,894,029 A | 4/1999 | Brown et al. ............... 426/302 |
| 5,922,379 A | 7/1999 | Wang ......................... 426/138 |
| 5,941,197 A | 8/1999 | Axelrod ...................... 119/710 |
| 5,947,061 A | 9/1999 | Markham et al. ........... 119/170 |

OTHER PUBLICATIONS

Winkalot Walky Bar Dog Treat., International Product Alert, v 15, n 6., Mar. 16, 1998.*
Brother et al., "Protein Plastics from Soybean Products," *Industrial and Engineering Chemistry*, pp. 1648–1651 (Dec. 1940).
Huang et al., "Protein Structures and Protein Fibers—A Review, "*Polymer Engineering and Science*, pp. 81–91 (Feb. 1974).
Schilling et al., Mechanical Properties of Biodegradable Soy–Protein Plastics, *J. Mater. Res.*, vol. 10, No. 9, pp. 2197–2202 (Sep. 1995).
Spence et al., "Soil and Marine Biodegradation of Protein Starch Plastics," *American Chemical Society*, pp. 149–158 (Nov. 1995).
Glenn et al., "Starch–Based Microcellular Foams," *Cereal Chemistry*, vol. 72, No. 2, pp. 155–161 (1995).
Schut, "Bold New High–Tech Biodegradables," *Plastics World*, pp. 29–33 (Dec. 1996).
Bhatnager et al., "Starch–Based Plastic Foams from Various Starch Sources," *Cereal Chemistry*, vol. 73, No. 5 pp. 601–604 (1996).
Wang et al. "Effects of Polyhydric Alcohols on the Mechanical Properties of Soy Protein Plastics," *J.M.S.—Pure Appl. Chem*, pp. 557–569 (1996).

* cited by examiner

Primary Examiner—Arthur L. Corbin
(74) Attorney, Agent, or Firm—Madson & Metcalf

(57) ABSTRACT

The present invention relates to an edible thermoplastic made from about 30 to 50 wt. % protein comprising a mixture of plant and animal derived protein, about 20 to 50 wt. % starch about 10 to 20 wt. % water, about 1 to 10 wt. % edible fiber, and about 0.5 to 3 wt. % metallic salt hydrate. When molded, the thermoplastic has good strength and stiffness and other physical properties. The edible thermoplastic may be molded in a variety of shapes including a segmented nutritional pet chew with a plurality of segments separated by a plurality of scores. The scores serve to structurally weaken the pet chew so that it may be broken into smaller pieces. When molded the edible thermoplastic has a density of about 1.2 to 1.5 g/cubic centimeters.

36 Claims, 1 Drawing Sheet

EDIBLE THERMOPLASTIC AND NUTRITIOUS PET CHEW

This application is a continuation-in-part of application Ser. No. 09/145,659, filed Sep. 2, 1998, now U.S. Pat. No. 6,379,725, which is a continuation in part of Ser. No. 09/072,857 filed on May 5, 1998, U.S. Pat. No. 5,922,379, issued on Jul. 13, 1999.

FIELD OF THE INVENTION

The invention relates to edible thermoplastics. More particularly to a pet chew made from an edible, protein-based nutritious thermoplastic and methods of use thereof.

TECHNICAL BACKGROUND

For many people, dogs and other pets animals play an important role in providing companionship and safety in the family environment. People are becoming more concerned about the health and hygiene of pets. Pet chews are commonly used to help massage the gums and to strengthen and clean the teeth of the dog or pet.

Most pets are playful in nature which endures the pet to the pet owner. However this playful disposition may be manifest in a destructive manner. Pets may destroy shoes, furniture, curtains, and other objects while expressing their playfulness. As a pet expends its playful energy on a pet chew, the pet is less inclined to destructively chew on household objects.

Chewing plays an important role in a dog's life. Not only does chewing aid the animal in digesting food and absorbing nutrition, but chewing also promotes healthy, strong teeth. Pets often chew on objects during teething. Puppies between the age of 2 and 6 months chew to relieve the pain of teething. Other young dogs also chew for teething reasons. Even though their teeth are in, the roots are not fully set and chewing relieves the pain of root setting.

For older dogs and other pets, chewing may also be a type of animal play. Most pets enjoy games of catch and will often chew on the object thrown to them.

For about as long as dogs have been a part of people's life, they have been given animal bones to chew on. The bones relieve the pain of teething, provides an play object, and provides some nutrition to the pet. However, some animal bones can splinter and cause internal injury to the pet.

Accordingly, many chews have been developed for use by pets. However, many chews are made with ingredients that can be harmful to a pet. For example, rawhide bones or floss toys, are enjoyed by most dogs because they contain a natural flavor. However, these chews may splinter and cause internal damage to the pet. Chews made of rawhide may be quickly destroyed by the chewing action of the pet. Furthermore, these artificial chews are inedible and provide little nutrition.

Other artificial chews are made of hard plastic in the form of a bone. These chews are made primarily for larger pets. Smaller pets and puppies cannot chew these plastic bones because of the bones' size and hardness. The plastic bones are also subject to splintering and care must be taken to prevent internal damage to the pet. Like rawhide bones, the plastic chew are also inedible and provide no nutrition to the pet.

There are several artificial pet chews currently marketed. One example is made of molded synthetic thermoplastic having animal meal dispersed in the plastic polymer. This chew is strong and causes little tooth wear which may occur with natural bones. However this chew is not edible and provides no nutrition. Furthermore, the synthetic polymer is not biodegradable, and can potentially harm the environment.

Other pet chews have been made from corn starch-based material with inter material or a corn starch vinyl-copolymer. These chews lack nutritional value and do not replace or supplement the pet's regular diet.

In all cases, care must be exercised when the dog is an aggressive chewer and is capable of breaking off an unusually large piece of the artificial chew.

Recently pet chews have been developed that serve different needs. For example environmentally friendly chews have been made of natural corn, wheat, or rice starch with a biodegradable co-polymer. Other chews contain cellulose fiber which is also biodegradable. In order to lessen the risk of injury to a pet, chews have been developed that are resistant to splintering.

However, there remains a need for a pet chew which is completely edible and biodegradable. It would be a further advancement in the art to provide a chew that is safe for pets of all ages and sizes. It would be an additional advancement to provide a pet chew that provided nutritional benefit to the pet. It would be a further advancement in the art if the chew provided complete balanced nutrition to the pet. It would be an additional advancement if the chew aided in maintaining good oral hygiene and the health of the pet's teeth and gums. It would be a further advancement in the art to provide a pet chew that may be used in training a pet. Such a pet chew and methods of use and manufacture are disclosed and claimed herein.

BRIEF SUMMARY OF THE INVENTION

The present invention is directed to an edible thermoplastic for use in animal chews and pet foods. The thermoplastic is made from a combination of plant and animal derived proteins. Other ingredients are added to ensure that the animal is provided a full compliment of calories and nutrition. To this end, the edible thermoplastic contains starch, fiber, and a metallic salt hydrate. In one preferred embodiment of the invention, the thermoplastic is made from about 30 to 50 wt. % of a mixture of plant protein and animal protein, about 20 to 50 wt. % starch, about 10 to 20 wt. % water, about 1 to 10 wt. % edible fiber, and about 0.5 to 3 wt. % metallic salt hydrate. When the thermoplastic is molded it preferably has a density of about 1.2 to 1.5 g/cubic centimeters.

A currently preferred plant protein is soybean protein. The soybean protein may be obtained from a variety of sources including soy protein concentrate, soy protein isolate, and a combination thereof.

The plant protein may also contain proteins from other plants including grains. Such grains may include, but are not limited to, wheat, rye, oats, barley, corn, rice, millet, and sorghum. The grain proteins are preferably selected from gliadin, gluten, secalin, avenin, hordein, zien, oryzenin, kafirin, and a combination thereof It should be appreciated that a combination of soy, grain, and other plant proteins is within the scope of the present invention.

The animal protein may also come from a variety of sources including, but not limited to, casein, albumin, collagen, gelatin, keratin, and combinations of these and other animal derived proteins.

The starch used in the thermoplastic may be a native, unmodified starch, a chemically altered starch, a pregelatinized starch, and a combination of these and other starches. If a native starch is used, the native starch preferably includes corn starch, high amylose corn starch, potato starch, sweet potato starch, wheat starch, rice starch, tapioca starch, sorghum starch, and a combination of these and other native, unmodified starches.

Examples of chemically altered starches that may be used in the present invention include, but are not limited to, hydroxyethyl starch, hydroxypropyl starch, carboxymethyl starch, acetylated high amylose starch, starch acetate, starch maleate, starch octenylsuccinate, starch succinate, starch phthalate, hydroxypropylate high amylose starch, cross-linked starch, starch phosphates, hydroxy propyl distarch phosphate, starch propionamide, and combinations of these and other chemically altered starches.

The edible fiber of the present invention may include soluble and insoluble fibers. These fibers may include dietary fiber, natural cellulose fiber, and combinations of these and other fibers.

The edible thermoplastic of the present invention preferably includes a metallic salt hydrate. In certain embodiments the metallic salt hydrate may be a calcium, sodium, potassium, zinc, iron, aluminum, or phosphorus salt, or a mixture thereof The metallic salt hydrate may also be a chloride, carbonate, sulfate, lactate, oxalate, borate, phosphate, or acetate salt, or a mixture thereof Examples of some currently preferred metallic salt hydrates that can be used in the present invention include $CaCl_2.2H_2O$, $CaSO_4.2H_2O$, $AlK(SO_4)_2.12H_2O$, $AlNH_4(SO_4)_2.12H_2O$, $FeCl_2.6H_2O$, $CaHPO_4.2H_2O$, $Ca(C_3H_5O_3)_2.5H_2O$, and $Na_2B_4O_7.10H_2O$.

In certain embodiments the edible thermoplastic of the present invention may contain flavorings in order to be more palatable to a pet. The flavoring is preferably present be present in an amount ranging from about 0.5 to 15 wt. %. These flavorings may include such natural flavorings as chicken powder, turkey powder, onion powder, garlic powder, plant oils, meat, animal products, chicken meat, chicken fat, beef hide, beef meat, beef fat, pork skin, pork meat, pork fat, dried meat floss, and a combination of these and other flavorings.

The edible thermoplastic may also contain up to 20 wt. % of edible plasticizers. More preferably, the edible thermoplastic may contain 12 to 18 wt. % edible plasticizers. The edible plasticizers preferably include, but are not limited to, glycerol, sorbitan, ethylene glycol, propylene glycol, diethylene glycol, dipropylene glycol, mannitol, sorbitol, and a combination of these and other edible plasticizers.

Up to 10 wt. % of a modifier may be added to improve the mechanical and processing properties of the edible thermoplastic. Such modifiers include sodium alginate, pectin, carrageenan, carob gum, agar, mannan, carbohydrate gum, and combinations thereof.

Nutrients may be added to the thermoplastic to enhance the nutritional content of the edible thermoplastic. Such nutrients may include vitamins, minerals, trace elements, animal fat, plant oil, lecithin, and herbs. The nutrients are preferably added in an amount up to 5 wt. % of the edible thermoplastic.

The vitamins may include, but are not limited to, vitamin A, vitamin, B, vitamin $B_2$, vitamin $B_3$, vitamin $B_{12}$, vitamin C, vitamin D, vitamin E, niacin, biotin, menadione, folic acid, pyridoxine, and combinations thereof.

Minerals such as calcium, potassium, magnesium, and sodium may also be provided as nutrients. Other nutrients may be contained in trace concentrations such as iron, phosphorus, zinc, manganese, iodine, selenium, and cobalt.

Oils are important in a pet's diet to provide for a healthy coat of fur. Accordingly, oils such as flax seed oil, sunflower oil, linolenic acid, beef fat, pork fat, and chicken fat may be added to the edible thermoplastic.

Some natural herbs such as flax seed, rosemary, anise, chamomile, valerian, nettle leaf, raspberry leaf, hyssop, yucca, and sage may also be added to provide nutritional benefits to the pet.

Because the thermoplastic is edible and contains nutrients, it is subject to spoilage. Thus, in certain embodiments the thermoplastic may contain preservatives such as calcium propionate, sorbic acid, potassium sorbate, butylated hydroxy anisole (BHA), butylate hydroxy toluene (BHT), ethoxyquin, lactic acid, benzoic acid, sodium benzoate, ethyl-p-hydroxybenzoate, propyl-p-hydroxybenzoate, and combinations of these and other known preservatives.

Pet oral hygiene is important to many pet owners who enjoy a close relationship with the pet. In certain embodiments the thermoplastic contains a hygiene additive to clean and care for the pet's mouth. Typical hygiene additives may include an anti-tartar agent, calcium pyrophosphate, sodium tripolyphosphate, zinc citrate, calcium hydrogen phosphate, dementholized peppermint oil, spearmint oil, sorbitol, and sorbitan.

The edible thermoplastic has certain physical properties when molded. In one embodiment the molded thermoplastic has a tensile strength from about 1 to 5 MPa.

More preferably, the tensile strength is from about 1.5 to 2.5 MPa. The molded thermoplastic may also have a percentage elongation from about 6 to 100%. More preferably, the percentage elongation is from about 20 to 80%. The molded thermoplastic may also have a Young's Modulus of about 65 to 2600 MPa. More preferably the Young's Modulus is about 65 to 1000 MPa.

The invention also relates to an nutritious pet chew molded into a segmented configuration such that individual segments can be broken off and given to the pet as desired. A pet chew may be formed having a plurality of segments separated by a plurality of notches, groves, perforations, or incisions or other localized structural weakenings, hereinafter referred to as scores. The scores serve to weaken the pet chew at predetermined locations. The weakened pet chew can be broken at the score location to remove a segment to give to the pet. The pet chew may be formed in a variety of cross sectional configurations. Such cross sections may include, but are not limited to, a circle, a square, a rectangle, a polygon, an oval, a star, or a fantasy shape such as the outline of a state, a dog breed, or other symbol.

In certain preferred embodiments the pet chew may be formed from the above described thermoplastic, but other known and novel compositions may be used to form the unique segmented configuration within the scope of the present invention.

The pet chew may be formed to be substantially linear or may be curved, circular, or take on any shape.

The pet chew preferably has a convenient length ranging from about 4 to 12 inches. Although the length can extend up to several feet if desired.

The present invention also discloses a method of training pet by using the segmented nutritious pet chew. This method includes obtaining a nutritious pet chew, applying a force to break the pet chew, delivering a segment of the pet chew to a pet, and allowing the pet to chew on the segment.

DESCRIPTION OF DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE INVENTION

Figure 1:
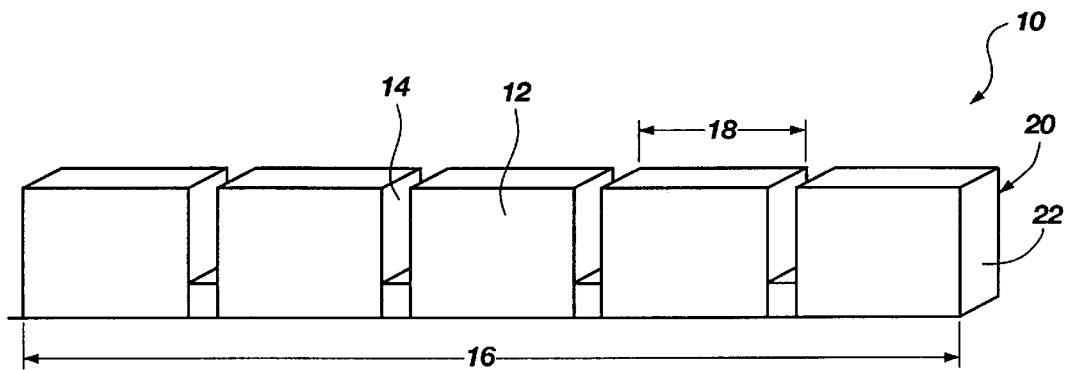
FIG. 1 is a perspective view of one embodiment of the nutritious pet chew of the present invention.

The present invention is directed to an edible thermoplastic for use in pet chews. The edible thermoplastic is formulated to provide balanced nutrition to the pet while caring for the pets oral hygiene. The edible thermoplastic is preferably made by combining plant and animal protein, starch, carbohydrates, various nutrients, dietary fibers, hygiene additives, preservatives, water, processing aids, flavorings, coloring agents, and modifiers.

The edible thermoplastic of the present invention has good processing flowability and excellent mechanical properties which make it useful for molding into pet chews and other forms.

In one currently preferred embodiment of the present invention the edible thermoplastic contains about 30 to 50 wt. % of a combination of plant and animal protein and 20 to 50 wt. % starch.

When molded the edible thermoplastic has good mechanical properties. The tensile strength preferably ranges from about 1 to 5 MPa. The percentage elongation preferably ranges from about 6 to 100%, The Young's Modulus preferably ranges from about 65 to 2600 mPa and more preferably from about 65 to 1000 MPa.

The texture, pliancy, and consistency of the molded edible thermoplastic encourage gnawing, making it beneficial to dogs and other pets. The gnawing action allows a pet's teeth to softly penetrate the molded thermoplastic, promoting clean, healthy teeth and fresh breath.

The protein is preferably be a combination of plant and animal protein. Plant protein and animal protein contain different amino acids, minerals, trace elements, vitamins, and other nutrients. Thus, the combination of plant and animal proteins in the edible thermoplastic provides a nutritional balance of amino acids, minerals, trace elements, vitamins, and other nutrients.

As previously mentioned the edible thermoplastic may be formulated with a plant protein. Such plant proteins include soybean protein. Soybean protein may be used alone in one embodiment of the invention or in combination with other plant or animal proteins. Soybean protein may be used in various forms such as soy protein isolate, soy protein concentrate, and a combination thereof Plant proteins from other sources such as grains may also be used in some embodiments of the edible thermoplastic. Such grains may include wheat, rye, oats, barley, corn, rice, millet, and sorghum. Thus, the plant proteins may include gluten, zein, hordein, avenin, kafirin, secalinin, panicin, and oryzenin in certain embodiments of the present invention.

Animal proteins may be used alone or in combination with the plant proteins. Examples of suitable animal proteins include casein, albumin, collagen, gelatin, and keratin. Microorganisms such as baker's yeast or beer yeast may also provide a source of protein in one embodiment of the invention.

In addition to the naturally occurring proteins listed above, chemically modified proteins can be used to improve the processing flowability and physical properties of compositions.

Starch is another ingredient of the edible thermoplastic of the present invention. The starch can be a native, unmodified starch, chemically modified starch, pregelatinized starch, of these and other starches. In certain embodiments of the present invention native starches such as include corn starch, including maize, waxy maize, and high amylose corn starch, potato starch, sweet potato starch, wheat starch, rice starch, tapioca starch, and a combinations thereof may be used. Starch and other carbohydrates may be provided in the form of cereal flour, such as wheat flour, rice flour, corn flour and a combination of these and other flours.

In order to provide balanced nutrition the edible thermoplastic may be enriched by added nutrients. In certain embodiments of the invention, the nutrient ingredients may include vitamins and minerals. All dogs and pets need vitamins and minerals in proper amounts and ratios for optimum health. Vitamin A, vitamin $B_1$, vitamin $B_2$, vitamin $B_3$, vitamin $B_{12}$, vitamin C, vitamin E, vitamin D, niacin (vitamin PP), biotin (vitamin H), menadione (vitamin K), folic acid (vitamin $B_0$), and pyridoxine ($B_6$) are needed by a pet. Thus, these and other vitamins may be added to the edible thermoplastic in certain embodiments of the present invention.

Minerals are essential for bone formation, muscle metabolism, fluid balance, and nervous system function. Minerals are present in living animals in either major or trace concentrations. Accordingly in certain embodiments of the present invention, the edible thermoplastic is enriched with minerals. Minerals which may be included in major concentrations are calcium, potassium, magnesium, and sodium. Although dietary requirements of trace elements are minimal, they are essential to maintaining good health. Minerals which may be included in trace concentrations are iron, phosphorous, zinc, manganese, iodine, selenium, and cobalt.

The edible thermoplastic may also include a metallic salt hydrate to supplement minerals. Such metallic salt hydrates may include calcium, sodium, potassium, zinc, or iron salts. The metallic salt hydrate may also be carbonate, sulfate, lactate, oxalate, borate, phosphate, sulphate, chloride salts or a mixture thereof as mineral nutrient. Examples of currently preferred metallic salts hydrates include, but are not limited to, $FeCl_2.6H_2O$, $CaHPO_4.2H_2O$, $Ca(C_3H_5O_3)_2.5H_2O$, $CaSO_4.2H_2O$, $AlK(SO_4)_2.12H_2O$, $AlNH_4(SO_4)_2.12H_2O$, $CaCl_2.2H_2O$, and $Na_2B_4O_7.10H_2O$. Metallic salts supply minerals for a balanced diet and also play a modifier role in manufacturing puppy teething treat. Preferably the edible thermoplastic includes at one of $CaSO_4.2H_2O$, $AlK(SO_4)_2.12H_2O$, $AlNH_4(SO_4)_2.12H_2O$, and $Na_2B_4O_7.10H_2O$ to improve the physical properties of the edible thermoplastic and as a processing aid. Moreover metal salts such as borax and other borate salts are not-toxic and exhibit bacteriostatic, fungicidal, and insecticidal properties that prolong the storage life of the edible thermoplastic.

Fiber is also an important aspect of the current invention. Natural crude fibers used in the edible thermoplastic may include soluble and insoluble dietary fibers. Insoluble fibers may come from wheat bran. Sources of soluble fibers include vegetable fiber, fruit fiber, and some grain fiber such as oats and barley.

Dietary fiber is important as a fecal bulking agent. Wheat bran is an effective fecal bulking agents. The major physiological benefits of natural crude fiber include promoting regularity, preventing constipation, and protecting against colon and other cancers.

An oral hygiene additive may also be included in the edible thermoplastic to promote healthy teeth and gums and good breath. Typical hygiene additives may include anti-tartar agents and fresheners. Hygiene additives such as calcium pyrophosphate, sodium tripolyphosphate, zinc citrate, and calcium hydrogen phosphate act as cleaning abrasives to clean the pet's teeth. Fresheners such as dem-entholized peppermint oil, spearmint oil, sorbitol, and sorbitan will help the pet's to maintain pleasant smelling breath.

The skin and hair are very important to dogs and other pets. Ingredients such as fatty acids other natural products may be added to the edible thermoplastic to promote healthy skin and hair. Fats are essential for good health of the skin and provide essential omega fatty acids to maintain moisture in skin cells. Fatty acids within the scope of the present invention may come from animal fat such as beef tallow, chicken fat, pork fat, fish meal, and fish oil. Other fatty acids such as flax seed oil provide other essential fatty acids such as Omega 3 that help to reduce the severity of allergic reactions to flea bites. Lecithin may also be added to the edible thermoplastic to aid in the digestion and absorption of fats that feed the coat. Natural herbs such as rosemary and sage may be added to stimulate hair bulb growth and healing of skin sores. Additionally, vitamin E, biotin, and niacin aids may be included in some embodiments of the edible thermoplastic in order to assist the growth and health of hair and skin.

Preservatives are often necessary in foods. Presently, dog food manufacturers use several antioxidants to prevent degradation of fat-soluble vitamins and to prevent spoilage of foods. Because the thermoplastic of the present invention is edible and biodegradable, preservatives may be necessary to prevent spoilage of the thermoplastic. Such preservatives may include butylated hydroxy anisole (BHA), butylated hydroxy toluene (BHT), ethoxyquin (6-ethoxy-1,2-dihydro-2,2,4-trimethylquinoline), vitamins C, and vitamin E. BHA and BHT are often used together and are generally recognized as safe (GRAS) by United States Food and Drug Administration. Ethoxyquin is an antioxidant manufactured by Monsanto Chemical Company that has been used in dog food for many years in the United States. However, ethoxyquin is presently banned in Europe. Preservatives used in connection with the present invention may also include bactericides, such as calcium propionate, sorbic acid, potassium sorbate, lactic acid, benzoic acid, sodium benzoate, ethyl-p-hydroxybenzoate, and propyl-p-hydroxybenzoate.

An additional ingredient of the edible thermoplastic is water. Water functions as a plasticizer during the mixing and processing of ingredients. An effective amount of water is preferably included in the edible thermoplastic to improve the processing flowability of the composition. The water content of the present invention may be adjusted from about 8 to 20 wt. %. Most of the water content is removed during processing and molding of the thermoplastic, after which the product is dried. The final molded article preferably contains from about 8 to 15 wt. % water. If too much water is present the thermoplastic may mildew and rot.

Other plasticizers may be used as processing aids. Such plasticizers improve the processing flowability of the thermoplastic. Plasticizers also enhance flexibility of articles made from the thermoplastic.

In certain embodiments of the invention a plasticizer is present in an amount up to 20 wt. %. In other embodiments of the invention the plasticizer is present in the range from about 12 to 18 wt. %. The plasticizers should be edible and chemically compatible with the thermoplastic of the present invention. Typical edible plasticizers which can be used in the present invention include glycerol, sorbitan, ethylene glycol, propylene glycol, diethylene glycol, dipropylene glycol, mannitol, and sorbitol.

Because the edible thermoplastic is made to be appealing to pets, flavorings may be included in the edible thermoplastic. Such flavorings provide flavors and odors that attract and entice a pet. In certain embodiments, the flavorings are preferably distributed throughout the molding composition so that the attractive odor or flavor remains throughout the life of the molded thermoplastic. Flavorings which may be used in accordance with the present invention include plant and animal flavors such as garlic powder, salt, onion powder, plant oils, corn oil, peanut oil, animal meat, animal products, beef hide, pork skin, chicken meat, chicken fat, beef meat, beef fat, pork meat, pork fat, and dried meat floss.

Ceratin modifiers may be added to the thermoplastic to enhance the mechanical properties, to improve the processing properties, and to improve the taste of the thermoplastic. Such modifiers may include carbohydrate gum such as pectin, carrageenan, carob gum, agar, mannan, and sodium alginate.

The edible thermoplastic of the present invention can be easily shaped by extrusion molding, injection molding, transfer molding, and compression molding. The molded product may have excellent physical properties, tensile strength, flexibility, rigidity, and surface hardness, as well as providing balanced nutrition to a pet.

In preparing the edible thermoplastic, the ingredients should be mixed uniformly. The mixing may be carried out in various ways, such as simple blending at room temperature using an agitated blender. The ingredients may also be premixed in a high speed mixer.

Moreover, the edible thermoplastic may be mixed in a twin screw extruder with a rod (L/D>4:1) or sheet die. The twin screw extruder may be a multi-mode twin screw with anti- or co-rotation screws. All the ingredients may be directly mixed in the twin screw extruder by feeding the ingredients into the extruder from individual hoppers in predetermined sections of the twin screw extruder.

The processing conditions can be varied as necessary to achieve effective mixing and to form a homogeneous composition. For instance, the temperature distribution along the extruder, pressure, screw speed, screw configuration, feed rate of the ingredients, and throughput rates may vary. One example of a twin screw extruder that may be used in making the thermoplastic is a twin screw extruder sold by Leistritz, the Micro-18.

The moisture content of the pet chew may be adjusted by drying. The water content is preferably from about 8 to 12 wt. %.

The extruder consists of six zones. Each zone having a different temperature range. The temperature of zone 1 may be about 85° C. The temperature of zone 2 may range from about 90 to 100° C. The temperature of zone 3 may range from about 110 to 120° C. The temperature of zone 4 may range from about 110 to 120° C. The temperature of zone 5 may be about 100° C. The temperature of zone 6 may range from 80 to 95° C. The die temperature was about 80° C., the screw speed may be set at about 150 rpm. The currently preferred extruder die pressure may range from about 160 to 880 psi.

Referring to FIG. 1, an nutritious pet chew 10 may have a plurality of segments 12 separated by a plurality of scores 14. The nutritious pet chew 10 may be formed from the edible thermoplastic disclosed above or other known and novel material used in the manufacture of pet chews such as nutritious compositions, plastic, rawhide, and the like.

The nutritious pet chew 10 may be molded in a manner such as extrusion molding, injection molding, compression molding and the like. The scores 14 may be formed during the molding process, or may be added afterward by cutting, perforating, or other similar weakening means.

Figure 2:
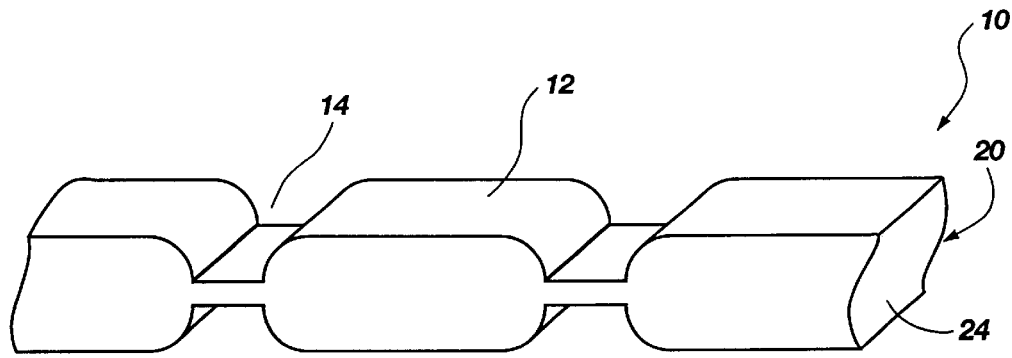
FIG. 2 is a perspective view of one embodiment of the nutritious pet chew of the present invention.
Figure 3:
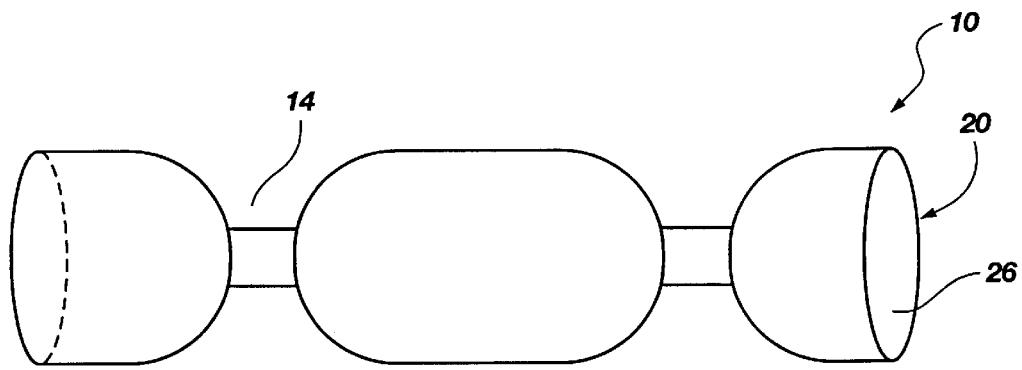
FIG. 3 is a perspective view of one embodiment of the nutritious pet chew of the present invention.

Referring now to FIGS. 1 to 3, the cross-section 20 of the nutritious pet chew 10 may be formed in a variety of forms such as square 22, rectangle 24, and circle 26. The cross-section 20 may also be formed in the shape of a star, an oval, or a fantasy shape such as a breed of dog, a trademark shape, the outline of a state, and the like.

When molded, the nutritious pet chew may possess a good tensile strength, in the range from about 1 to 5 MPa, preferably about 1.5 to 2.5 MPa. It may have good flexibility with a percentage elongation of about 20 to 100%, preferably about 20 to 80%. The Young's modulus may be about 65 to 2,600 MPa, preferably about 65 to 1,000 MPa.

The nutrious pet chew 10 is formed from a plurality of segments 12. The length 16 of the nutritious pet chew may vary from about 4 inches to a few feet, but for convenience, the legnth preferably ranges from about 4 to 12 inches. The length of the segments 18 also may vary, using such lengths as ¼ inch, ½ inch, ¾ inch, up to 1 inch or more.

During training of a pet, segments 12 may be snapped off and removed by applying a bending force across a score 14. Once a segment is removed it may be given to a pet as a reward, tossed to a pet to retrieve, or used as a simple chew toy.

The invention will be further described by reference to the following detailed examples. These examples are not meant to limit the scope of the invention that has been set forth in the foregoing descriptions. In the following examples, compositions within the scope of the present invention were molded into a standard testing specimen as described in American Society for Testing and Materials (ASTM D 638-86). Tensile properties of the molded articles were tested according to ASTM Standard method D638-86 using an Instron Universal Testing System (Model 4465).

EXAMPLE 1
The Physical Properties of the Edible Thermoplastic

The edible thermoplastic was made of a combination of plant protein and animal derived proteinic material composition with starch or carbohydrates. The ingredients were premixed together in a high speed mixer, Henschel Mixers America, Inc., FM10 heater mixers at room temperature, mixer speed 1800 rpm for 3 to 4 minutes. The ingredients were further processed by a Leistritz Micro-18 Co-rotating twin screw extruder with a 6 inch sheet die having six barrel zones.

Each zone had the following temperature profile: zone 1 about 90° C., zone 2 about 90–100° C., zone 3 about 110° C., zone 4 about 110° C., zone 5 about 90° C., and zone 6 about 85° C. The die temperature was about 80° C. The screw speed was set at about 150 rpm. The die pressure was from about 160 to 880 psi.

After the sheet was extruded, the ASTM Standard Test Specimens were processed according to the American Society for Testing and Material (ASTM D638-86). The sheet thickness was about 2.00 mm.

The ingredients and results of this composition are shown are shown in Table 1. Table 1 also shows the physical properties the molded edible thermoplastic made from a combination of plant protein, animal protein, and starch.

These physical properties show very good results and suitable strength for use of the edible thermoplastic in pet chews. The tensile strength is about 1.0 to 2.0 MPa. The thermoplastic sheet has good hardness and excellent stiffness for such a use. The percentage elongation is about 17.0 to 103 %. The Young's Modulus is about 65 to 166 MPa.

The results show that the pet chew made of a combination of wheat gluten and gelatin has larger elongation percentage than both the combination of soy protein isolate and casein and a combination of soy protein concentrate, wheat gluten, and gelatin.

The edible thermoplastic has an excellent softness and stiffness, but the Young's Modulus may be lower than desired.

Sample 4 shows that the puppy teething treat made of a combination of soy protein concentrate, wheat gluten and gelatin. The thermoplastic of sample 4 has a better combination of rigidity and stiffness than sample 2 and 3 as well as higher tensile strength and better elongation percentage and Young's Modulus.

TABLE 1

| | Sample No. | | | |
|---|---|---|---|---|
| Ingredients[1] | 1 | 2 | 3 | 4 |
| Soy Protein[2] | 23.6 | — | 31.1 | 15.55 |
| Wheat Gluten[3] | 23.6 | 31.1 | — | 15.55 |
| Casein[4] | — | — | 8.5 | — |
| Gelatin[5] | 12.8 | 8.5 | — | 8.5 |
| Corn Starch[6] | — | 25.4 | 25.4 | 25.4 |
| Garlic Powder[7] | 1.72 | 1.1 | 1.1 | 1.1 |
| Onion Powder[8] | 1.72 | 1.1 | 1.1 | 1.1 |
| Lecithin[9] | 0.85 | 0.6 | 0.6 | 0.6 |
| Turkey Powder[10] | 4.3 | 2.8 | 2.8 | 2.8 |
| Chicken Powder[11] | 4.3 | 2.8 | 2.8 | 2.8 |
| $CaCO_3$[12] | 0.85 | 0.6 | 0.6 | 0.6 |
| Tricalcium Phosphate[13] | 0.85 | 0.6 | 0.6 | 0.6 |
| $VD_3$[14] | 0.04 | 0.03 | 0.03 | 0.03 |
| $H_2O$[15] | 8.47 | 8.47 | 8.47 | 8.47 |
| Glycerol[16] | 16.9 | 16.9 | 16.9 | 16.9 |
| Mechanical Properties | | | | |
| Specimen Moisture Content(wt. %) | 14.0 | 11.0 | 13.0 | 10.0 |
| Tensile Strength (MPa) | 1.62 | 0.978 | 1.47 | 1.53 |
| Elongation (%) | 52.5 | 103 | 17.0 | 65.2 |
| Young's Modulus (MPa) | 203 | 65.1 | 11.6 | 166 |
| Processing Properties | | | | |
| T Die (° C.) | 74 | 68 | 75 | 80 |
| Screw Speed (rpm) | 150 | 150 | 150 | 150 |
| Feeder Rate (%) | 14 | 23 | 18 | 24 |
| Die Pressure (psi) | 560 | 160 | 230 | 170 |

[1]Ingredients are based by total weight as 100 parts.
[2]Soy Protein: Sample No. 3 is PROFAM ® 648 Isolated Soy Protein Archer Daniels Midland Company; Sample Nos. 1,4 are PROFINE ® VF Soy Protein Concentrate, Central SOYA Co., Inc.
[3]Wheat Gluten: GEM OF THE WEST ® Vital Wheat Gluten, Manildra Milling Corporation
[4]Casein: from bovine milk, approximately 90% protein (biuret) and 0.2% Lactose, SIGMA Chemical Co.
[5]Gelatin: 250 Bloom, Dynagel, Inc.
[6] Corn Starch: C Polar Tex 05735, Stabilized and Crosslinked corn starch E1442 (hydroxypropl distrach phosphate), CERESTAR USA, INC.

TABLE 1-continued

|  | Sample No. | | | |
| --- | --- | --- | --- | --- |
| Ingredients[1] | 1 | 2 | 3 | 4 |

[7]Garlic Powder: Tone's Brothers, Inc.
[8]Onion Powder: Tone's Brothers, Inc.
[9]Lecithin: Enhance 97, Central Soya Co., Inc.
[10]Turkey Powder: Mondovi Foods Corporation
[11]Chicken Powder: Mondovi Foods Corporation
[12]$CaCO_3$ LIGHT ® Calcium Carbonate, Specialty Minerals, Inc.
[13]Tricalcium Phosphate: FMC ® Food Grade, FMC Corporation Phosphorus Chemicals Div.
[14]Vitamin D3: Vitamins, Inc.
[15]Water: Distilled Water, WalMart Stores, Inc.
[16]Glycerol: Glycerine 99.5% USP, Ashland Chemical Company

EXAMPLE 2

The Effect of Starch Carbohydrates, and Modifiers on the Physical Properties of the Thermoplastic Table 2 shows the effect of starch, carbohydrates, and modifiers on physical properties of edible thermoplastic. The ingredients of the testing specimens and preparation method are same as in Example 1. The results are shown in Table 2.

Samples 1 and 2 show that the combination of soy protein concentrate and wheat gluten with carbohydrates, and wheat flour has a higher tensile strength and Young's Modulus than the combination of soy protein concentration and wheat gluten with corn starch.

In sample 3 sodium alginate was added as a modifier in the amount of 5.3 wt. %. The results show that the tensile strength and Young's Modulus were increased by adding sodium alginate.

In sample 4 the carbohydrate gum, nutricol, was added as a modifier in the amount of 2.7 wt. % based on total weight of sample 1. The results show the tensile strength and Young's Modulus were increased by adding the carbohydrate gum. Thus, the the physical properties of the edible thermoplastic may be improved by the addition of a modifier.

TABLE 2

| | Sample No. | | | |
| --- | --- | --- | --- | --- |
| Ingredients[1] | 1 | 2 | 3 | 4 |
| Soy protein concentrate (VF) | 15.55 | 15.55 | 14.7 | 15.1 |
| Wheat gluten | 15.55 | 15.55 | 14.7 | 15.1 |
| Gelatin | 8.5 | 8.5 | 8.0 | 8.24 |
| Corn starch | 25.4 | — | 24.1 | 24.7 |
| Wheat flour[2] | — | 25.4 | — | — |
| Sodium alginate[3] | — | — | 5.3 | — |
| Nutricol GP 751 F[4] | — | — | — | 2.75 |
| Garlic Powder | 1.1 | 1.1 | 1.1 | 1.1 |
| Onion Powder | 1.1 | 1.1 | 1.1 | 1.1 |
| Lecithin | 0.6 | 0.6 | 0.52 | 0.55 |
| Turkey Meal | 2.8 | 2.8 | 2.7 | 2.75 |
| Chicken Meal | 2.8 | 2.8 | 2.7 | 2.75 |
| $CaCO_3$ | 0.6 | 0.6 | 0.52 | 0.55 |
| Tricalcium phosphate | 0.6 | 0.6 | 0.52 | 0.55 |
| VD | 0.03 | 0.03 | 0.03 | 0.03 |
| $H_2O$ | 8.47 | 8.47 | 8.01 | 8.23 |
| Glycerol | 16.9 | 16.9 | 16.0 | 16.5 |
| Mechanical Properties | | | | |
| Specimen Moisture Content(wt. %) | 10.0 | 12.0 | 11.1 | 11.0 |
| Tensile Strength (MPa) | 1.53 | 1.99 | 2.23 | 1.76 |
| Elongation (%) | 65.2 | 27.4 | 40.3 | 63.8 |
| Young's Modulus (MPa) | 166 | 316 | 263 | 380 |
| Processing Conditions | | | | |
| T die (° C.) | 80 | 78 | 77 | 76 |
| Screw speed (rpm) | 150 | 150 | 150 | 150 |
| Feeder rate (%) | 24 | 31 | 30 | 22 |
| Die pressure (psi) | 170 | 180 | 210 | 260 |

[1]Ingredients are same as in Table 1, and are based by total weight as 100 parts.
[2]Wheat Flour: GOLD METAL FLOUR ®, all-purpose, General Mills Sales, Inc.
[3]Sodium alginate: Alginic acid sodium salt, Research Chemicals Ltd.
[4]Nutricol GP 751 F: NUTRICOL ® Konjac Flour blend with carrageenan and dextrose, FMC Corporation Marine Colloids Division

EXAMPLE 3

The Effect of Moisture Content on the Physical Properties of the Edible Thermoplastic Table 3 shows the effect of the moisture content on the physical properties of the edible thermoplastic. Physical properties such as tensile strength and Young's Modulus were increased with a lower moisture content. The elongation percentage was decreased with lower moisture content in the testing specimens.

Additionally moisture content is important in the maintenance and prevention of edible thermoplastic. This example illustrates that a moisture content of about 8 to 12 wt. % may have the best physical characteristics while protecting against spoilage.

TABLE 3

| | Sample No. | | |
| --- | --- | --- | --- |
| Ingredients[1] | 1 | 2 | 3 |
| Soy Protein Concentrate (VF) | 15.55 | | |
| Wheat Gluten | 15.55 | | |
| Gelatin | 8.5 | Same | Same |
| Corn Starch | 25.4 | | |
| Garlic Powder | 1.1 | | |
| Onion Powder | 1.1 | | |
| Lecithin | 0.6 | | |
| Turkey Meal | 2.8 | | |
| Chicken Meal | 2.8 | | |
| $CaCO_3$ | 0.6 | | |
| Tricalcium Phosphate | 0.6 | | |
| $VD_3$ | 0.03 | | |
| $H_2O$ | 8.47 | | |
| Glycerol | 16.9 | | |
| Mechanical Properties | | | |
| Specimen Moisture Content (wt. %) | 10.0 | 9.0 | 6.1 |
| Tensile strength (MPa) | 1.53 | 4.08 | 476 |
| Elongation (%) | 65.2 | 16.1 | 5.38 |
| Young's Modulus (MPa) | 166 | 1451. | 2610 |
| Processing Conditions | | | |
| Same processing conditions: | T die = 80(° C.) | Screw Speed 150 (rpm) | Die pressure = 600 (psi) |

[1]Ingredients are same as in Table 1, and are based by total weight as 100 parts.

EXAMPLE 4

The Effect of Dietary Fibers on Physical Properties of the Edible Thermoplastic

Table 4 illustrates the effect of fiber on the physical properties of the edible thermoplastic. As shown by samples 1 and 2 the tensile strength and Young's Modulus were increased with the addition of dietary fiber, while the elongation percentage was decreased with the addition dietary fiber.

The dietary fibers not only improve physical properties of the edible thermoplastic, but also have physiological benefits of promoting regularity, preventing constipation, protecting against colon and other cancers. Fiber also helps in cleaning a pet's teeth. Accordingly, the fiber content of the edible thermoplastic preferably ranges from about 0.5 to 10 wt %.

TABLE 4

| | Sample No. | |
|---|---|---|
| Ingredients[1] | 1 | 2 |
| Soy protein concentrate (VF) | 100 | 100 |
| Wheat Gluten | 100 | 100 |
| Gelatin | 54.5 | 54.5 |
| Corn Starch | 163.6 | 163.6 |
| Dietary fiber[2] | — | 72.7 |
| Garlic Powder | 7.3 | 7.3 |
| Onion Powder | 7.3 | 7.3 |
| Lecithin | 3.6 | 3.6 |
| Turkey Powder | 18.2 | 18.2 |
| Chicken Powder | 18.2 | 18.2 |
| $CaCO_3$ | 3.6 | 3.6 |
| Tricalcium phosphate | 3.6 | 3.6 |
| $VD_3$ | 0.2 | 0.2 |
| $H_2O$ | 54.5 | 54.5 |
| Glycerol | 109 | 109 |
| Mechanical Properties | | |
| Specimen Moisture Content (wt. %) | 10.0 | 10.0 |
| Tensile strength (MPa) | 1.53 | 2.34 |
| Elongation (%) | 65.2 | 25.7 |
| Young's Modulus (MPa) | 166 | 325 |
| Processing Conditions | | |
| T die (° C.) | 80 | 80 |
| Screw speed (rpm) | 150 | 150 |
| Die pressure (psi) | 170 | 880 |

[1]Ingredients are same as Table 1, and are by parts based on soy protein concentration as 100 parts.
[2]Dietary fibers: purified powdered cellulose, Grade BH 65 FCC, 50 microns, International Filler Corporation.

The present invention may be embodied in other specific forms without departing from its essential characteristics. The described embodiments are to be considered in all respects as illustrative only, and not restrictive. The scope of the invention is, therefore, indicated by the appended claims, rather than by the foregoing description. All changes within the meaning and range of equivalency of the claims are to be embraced within their scope.

The claimed invention is:

1. A nutritious pet chew comprising:
    an edible thermoplastic comprising about 30 to 50 wt. % protein comprising a mixture of plant and animal derived protein,
    about 20 to 50 wt. % starch,
    about 10 to 20 wt. % water,
    about 1 to 10 wt. % edible fiber,
    about 0.5 to 3 wt. % metallic salt hydrate, and
    wherein the edible thermoplastic when molded has a density of about 1.2 to 1.5 g/cubic centimeters.

2. The nutritious pet chew of claim 1, wherein the plant derived protein is soybean protein.

3. The nutritious pet chew of claim 2, wherein the soybean protein is selected from soy protein concentrate, soy protein isolate, and a combination thereof.

4. The nutritious pet chew of claim 1, wherein the plant derived protein is selected from the group consisting of gluten, zein, hordein, avenin, kafirin, secalin, oryzenin, and a combination thereof.

5. The nutritious pet chew of claim 1, wherein the animal derived protein is selected from the group consisting of casein, albumin, collagen, gelatin, keratin, and a combination thereof.

6. The nutritious pet chew of claim 1, wherein the starch is a native, unmodified starch, a chemically modified starch, a pregelatinized starch, or a combination thereof.

7. The nutritious pet chew of claim 1, wherein the starch is a native starch selected from the group consisting of corn starch, high amylose corn starch, potato starch, sweet potato starch, wheat starch, rice starch, tapioca starch, sorghum starch, and a combination thereof.

8. The nutritious pet chew of claim 1, wherein the starch is a chemically modified starch selected from the group consisting of hydroxyethyl starch, hydroxypropyl starch, carboxymethyl starch, acetylated high amylose starch, starch acetate, starch maleate, starch octenylsuccinate, starch succinate, starch phthalate, hydroxypropylate high amylose starch, cross-linked starch, starch phosphates, hydroxy propyl distarch phosphate, starch propionamide, and a combination thereof.

9. The nutritious pet chew of claim 1, wherein the edible fiber is selected from the group consisting of soluble and insoluble dietary fiber, soluble and insoluble natural cellulose fiber, and a combination thereof.

10. The nutritious pet chew of claim 1, wherein the metallic salt hydrate is a calcium, sodium, potassium, zinc, iron, aluminum or phosphorus salt, or a mixture thereof.

11. The nutritious pet chew of claim 1, wherein the metallic salt hydrate is a chloride, carbonate, sulfate, lactate, oxaiate, borate, phosphate, or acetate salt or a mixture thereof.

12. The nutritious pet chew of claim 1, wherein the metallic salt hydrate is selected from the group consisting of $FeCl_2.6H_2O$, $CaHPO_4.2H_2O$, $Ca(C_3H_5O_3)_2.5H_2O$, $CaSO_4.2H_2O$, $AlK(SO_4)_2.12H_2O$, $AlNH_4(SO_4)_2.12H_2O$, $Na_2B_4O_7.10H_2O$, $CaCl_2.2H_2O$, or a combination thereof.

13. The nutritious pet chew of claim 1, further comprising about 0.5 to 15 wt. % flavoring.

14. The nutritious pet chew of claim 13, wherein the flavoring is selected from the group consisting of chicken powder, turkey powder, onion powder, garlic powder, plant oils, meat, animal products, chicken meat, chicken fat, beef hide, beef meat, beef fat, pork skin, pork meat, pork fat, dried meat floss, or a combination thereof.

15. The nutritious pet chew of claim 1, further comprising about up to 20 wt. % edible plasticizers.

16. The nutritious pet chew of claim 15, wherein the edible plasticizer is selected from the group consisting of glycerol, sorbitan, ethylene glycol, propylene glycol, diethylene glycol, dipropylene glycol, mannitol, sorbitol, and combinations thereof.

17. The nutritious pet chew of claim 1, further comprising about 12 to 18 wt. % edible plasticizers.

18. The nutritious pet chew of claim 17, wherein the edible plasticizer is selected from the group consisting of glycerol, sorbitan, ethylene glycol, propylene glycol, diethylene glycol, dipropylene glycol, mannitol, sorbitol, and combinations thereof.

19. The nutritious pet chew of claim 1, further comprising up to 10 wt. % modifier to improve mechanical and processing properties of the edible thermoplastic.

20. The nutritious pet chew of claim 19, wherein the modifier is selected from the group consisting of sodium alginate, pectin, carrageenan, carob gum, agar, mannan, carbohydrate gum, or a combination thereof.

21. The nutritious pet chew of claim 1, further comprising up to 5 wt. % nutrients.

22. The nutritious pet chew of claim 21, wherein the nutrients comprise at least one of a vitamin, a mineral, a trace element, animal fat, plant oil, lecithin, and an herb.

23. The nutritious pet chew of claim 22, wherein the vitamin is selected from the group consisting of vitamin A, vitamin $B_1$, vitamin $B_2$, vitamin $B_3$, vitamin $B_{12}$, vitamin C, vitamin D, vitamin C, vitamin E, niacin, biotin, menadione, folic acid, pyridoxine, and a combination thereof.

24. The nutritious pet chew of claim 22, wherein the mineral is selected from the group consisting of calcium, potassium, magnesium, sodium, and a combination thereof.

25. The nutritious pet chew of claim 22, wherein the trace element is selected from the group consisting of iron, phosphorous, zinc, manganese, iodine, selenium, and cobalt.

26. The nutritious pet chew of claim 22, wherein the herb is selected from the group consisting of flax seed, flax seed oil, sunflower oil, linolenic acid, rosemary, sage, anise, chamomile, valerian, nettle leaf, raspberry leaf, hyssop, yucca, and a combination thereof.

27. The nuritritious pet chew of claim 1, further comprising a preservative wherein the preservative is selected from the group consisting of calcium propionate, sorbic acid, potassium sorbate, butylated hydroxy anisole (BHA), butylated hydroxy toluene (BHT), ethoxyquin, lactic acid, benzoic acid, sodium benzoate, ethyl-p-hydroxybenzoate, propyl-p-hydroxybenzoate, and a combination thereof.

28. The nutritious pet chew of claim 1, further comprising a hygiene additive.

29. The nutritious pet chew of claim 28, wherein the hygiene additive is selected from the group consisting of an anti-tartar agent, calcium pyrophosphate, sodium tripolyphosphate, zinc citrate, calcium hydrogen phosphate, dementholized peppermint oil, spearmint oil, sorbitol, and sorbitan.

30. The nutritious pet chew of claim 1, wherein the thermoplastic, when molded, has a tensile strength from about 1 to 5 MPa.

31. The nutritious pet chew of claim 1, wherein the thermoplastic, when molded, has a tensile strength from about 1.5 to 2.5 MPa.

32. The nutritious pet chew of claim 1, wherein the thermoplastic, when molded, has a percentage elongation of about 6 to 100%.

33. The nutritious pet chew of claim 1, wherein the thermoplastic, when molded, has a percentage elongation of about 20 to 80%.

34. The nutritious pet chew of claim 1, wherein the thermoplastic when molded, has a Young's Modulus of about 65 to 2,600 MPa.

35. The nutritious pet chew of claim 1, wherein the thermoplastic, when molded, has a Young's Modulus of about 65 to 1,000 MPa.

36. The nutritious pet chew of claim 1, prepared by extrusion molding, compression molding, transfer molding, or injection molding.

* * * * *